US012288484B1

(12) United States Patent
Meyer et al.

(10) Patent No.: US 12,288,484 B1
(45) Date of Patent: Apr. 29, 2025

(54) MATERIAL MOUNTING APPARATUS

(71) Applicants: Michael Meyer, Goodyear, AZ (US); Laurie Lynn McCarthy-Meyer, Goodyear, AZ (US)

(72) Inventors: Michael Meyer, Goodyear, AZ (US); Laurie Lynn McCarthy-Meyer, Goodyear, AZ (US)

( * ) Notice: Subject to any disclaimer, the term of this patent is extended or adjusted under 35 U.S.C. 154(b) by 0 days.

(21) Appl. No.: 18/753,203

(22) Filed: Jun. 25, 2024

(51) Int. Cl.
*G09F 15/00* (2006.01)

(52) U.S. Cl.
CPC ...... *G09F 15/0012* (2013.01); *G09F 15/0025* (2013.01)

(58) Field of Classification Search
CPC .......................... G09F 15/0012; G09F 15/0025
See application file for complete search history.

(56) References Cited

U.S. PATENT DOCUMENTS 2,209,972 A * 8/1940 Horwitt ................ A47G 1/0644 248/490
2,456,225 A * 12/1948 Carroll ................... B44D 3/185 160/402
4,006,771 A * 2/1977 Spurkel .................... B44D 7/00 160/378
4,149,332 A * 4/1979 Horwitt ................ A47G 1/0644 40/761
4,373,279 A * 2/1983 Abel ...................... B44D 3/185 248/490
4,635,700 A * 1/1987 Berger ................... B44D 3/185 160/374.1
4,771,559 A * 9/1988 Keithley ............. G09F 15/0012 40/603
4,773,174 A * 9/1988 Boeniger ................. A47G 1/06 40/739
5,090,143 A * 2/1992 Schier ....................... G09F 1/12 40/757
5,365,682 A * 11/1994 Eubank, Jr., deceased ................ A47G 1/0644 40/746
5,649,390 A * 7/1997 Davidson .................. B44C 5/00 52/63
2003/0200685 A1* 10/2003 Gibb ................... G09F 15/0025 40/624
2004/0200103 A1* 10/2004 Dombrowski .......... G09F 17/00 40/606.17
2006/0107571 A1* 5/2006 Steer ................... G09F 15/0025 40/606.12
2021/0070098 A1* 3/2021 van Os ..................... G09F 7/18

* cited by examiner

*Primary Examiner* — Gary C Hoge
(74) *Attorney, Agent, or Firm* — Inspired Idea Solutions Law Firm

(57) ABSTRACT

A material mounting apparatus may include a body having a front side and a back side. One or more body attachment elements may be secured to the back side of the body. One or more connectors may be secured to and extend from the one or more body attachment elements. A material may be placed over the front side of the body. An outer perimeter of the material may extend beyond a perimeter of the body. The outer perimeter of the material may be folded across the perimeter of the body into an adjacent relationship with the back side of the body. The one or more connectors may be secured to the material to retain and/or stretch the material over the material mounting apparatus.

20 Claims, 3 Drawing Sheets

MATERIAL MOUNTING APPARATUS

FIELD

The present disclosure generally relates to an apparatus for mounting flat materials, and more particularly to the mounting of textiles for display purposes.

BACKGROUND

Flat materials, including textiles, have been hung for thousands of years. Ancient Egyptians, Incas, Greeks, and Romans used tapestries for various purposes. Hanging has been achieved by mounting at discrete intervals along the upper edge of the flat material to a wall or ceiling. Hanging has also been achieved by mounting along the upper edge of the flat material to a rod, where the rod is secured to a wall or ceiling.

While the above methods are common, they come with drawbacks. For example, mounting at discrete intervals causes point loading on the flat material, which can cause stretching and/or tearing of the material. Mounting to a rod can have similar issues where the flat material is mounted at discrete intervals along the rod. Nevertheless, even if mounted along the entire length, these methods don't prevent movement of the lower portion of the flat material. Therefore, environmental factors may impact the flat material. Wind may catch the material and put greater stress on the mounting system. Further, the flat material may not hang evenly with these mounting systems, such that the material may hang with ripples or other imperfections.

Therefore, it would be desirable to optimize mounting of flat materials in order to improve visibility and performance of the mounting hardware.

SUMMARY

A material mounting apparatus capable of receiving a material having a perimeter, comprising a body, the body having a front side and a back side, a plurality of body attachment elements secured to the body along the back side, and a plurality of connectors coupled to the plurality of body attachment elements, wherein the material extends across the front side of the body, wherein the perimeter of the material folds around to the back side of the body, and wherein the plurality of connectors are coupled to the material.

A material mounting apparatus capable of receiving a material, comprising a body, a plurality of body attachment elements secured to a first side of the body, and a plurality of connectors coupled to the plurality of body attachment elements, wherein the material extends across a second side of the body, wherein a perimeter of the material extends from the second side to the first side of the body, and wherein the plurality of connectors are coupled to the material.

A method of mounting a material to a body of a material mounting apparatus, comprising securing a plurality of body attachment elements to a first side of the body of the material mounting apparatus, extending the material across a second side of the body, folding a perimeter portion of the material across a perimeter portion of the material mounting apparatus until the perimeter portion of the material extends to the first side of the body, securing a plurality of connectors to the plurality of body attachment elements, and securing the plurality of connectors to the material.

BRIEF DESCRIPTION OF THE DRAWINGS

Various aspects and advantages will become apparent upon review of the following detailed description and upon reference to the drawings in which.

DETAILED DESCRIPTION

The following disclosure includes a material mounting apparatus and method of applying a material to a material mounting apparatus. The material may be placed in a covering relationship over one side (e.g., a front side) of the material mounting apparatus. Yet, the material may be larger than the material mounting apparatus, such that an outer region of the material (e.g., a perimeter portion) may extend beyond the material mounting apparatus. This outer region may be folded over and/or extended across the perimeter of the material mounting apparatus until it is adjacent the opposing side (e.g., a back side) of the material mounting apparatus.

One or more connectors may be secured to the opposing side of material mounting apparatus. Once the material has been folded over and/or extended across to the opposing side of the material mounting apparatus, the one or more connectors may be secured to the material to retain the material in place. The one or more connectors may pull the material so as to stretch it over the material mounting apparatus, and may cause the material to conform to the shape of the material mounting apparatus.

Figure 1:
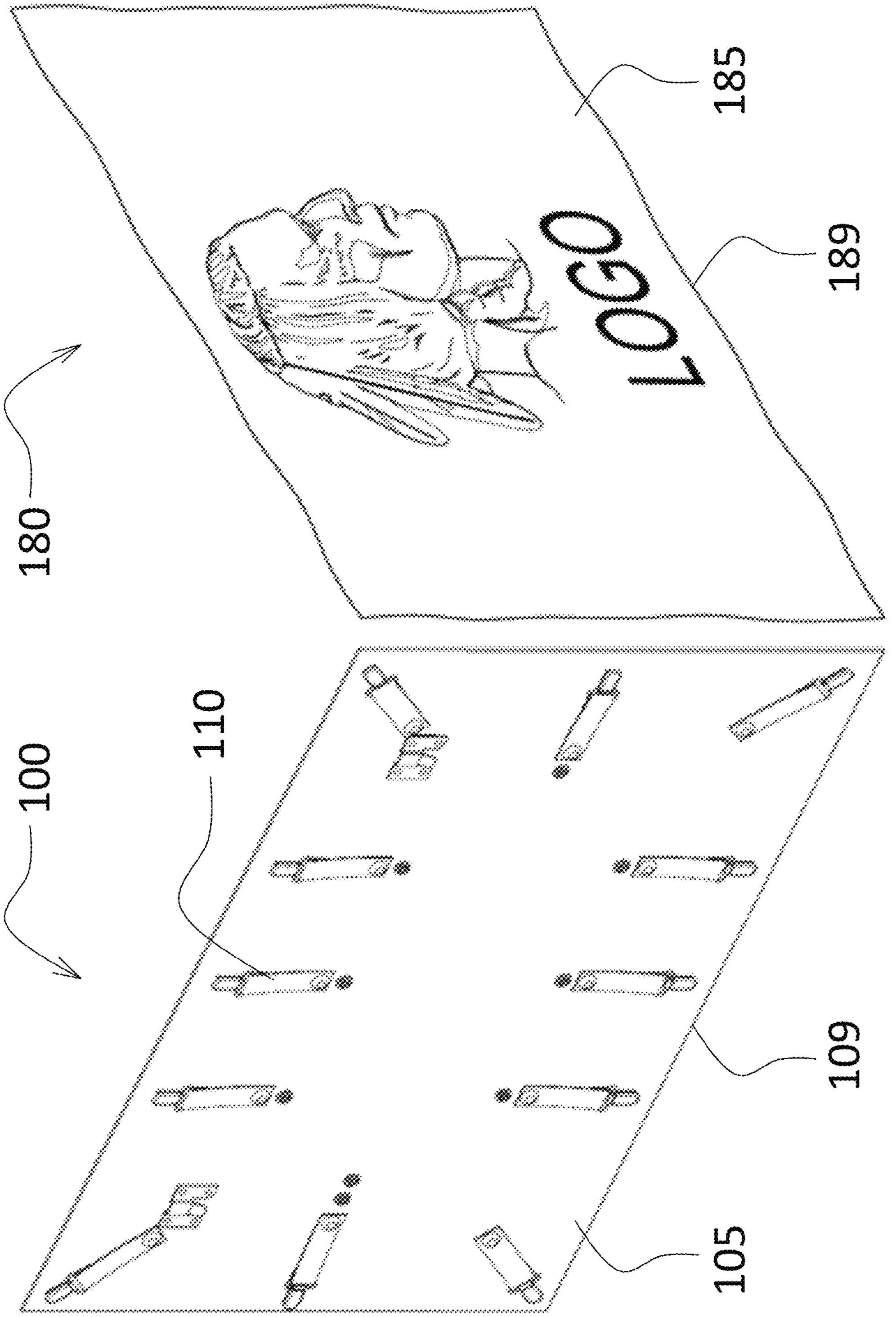
FIG. 1 illustrates an isometric view of a material mounting apparatus adjacent a flat material.

FIG. 1 illustrates a material mounting apparatus 100 exemplified as adjacent to material 180. Material 180 may be formed of fabric and/or a textile material (e.g., having a weave and/or pattern). Material 180 may be formed of synthetic material. Material 180 may be a composite material that is formed of two or more other materials. Material 180 may be flat. Material 180 may be flexible. Material 180 may be compliant. Material 180 may be foldable and/or bendable. Material 180 may be stretchable.

Material 180 may have a body defined by a material front side 185, a material back side (not shown), and a material perimeter 189. The material back side may be opposite of material front side 185. Material 180 may be capable of receiving one or more colors, logos, designs, images, or graphics (e.g., by printing).

Material mounting apparatus 100 may have a body defined by an apparatus front side (not shown) and an apparatus back side 105, and an apparatus perimeter 109. The apparatus front side may be opposite of the apparatus back side 105. Material mounting apparatus 100 may be sized and/or shaped to receive material 180 (e.g., the apparatus front side receiving the material back side). Material mounting apparatus 100 may be smaller in dimension than material 180 (e.g., smaller in height and/or width dimensions). Apparatus perimeter 109 may be less than material perimeter 189.

During mounting of material 180 to material mounting apparatus 100, material 180 may be positioned in close proximity to material mounting apparatus 100. The body of material 180 may be placed in an abutting relationship with the body of material mounting apparatus 100. The apparatus front side may receive the material back side. During mounting of material 180 to material mounting apparatus 100, the material perimeter 189 may be oriented and/or aligned so that material perimeter 189 is positioned beyond the apparatus perimeter 109 (e.g., in every direction across the plane created by apparatus back side 105).

Material perimeter 189 may be moved across apparatus perimeter 109 and may be brought into contact with apparatus back side 105. Material perimeter 189 may be pulled across apparatus perimeter 109 and may be brought into contact with one or more connectors 110 (e.g., as exemplified in FIG. 2). The one or more connectors 110 may be secured to apparatus back side 105. In this way, material 180 may be secured to material mounting apparatus 100 with material front side 185 positioned for display (e.g., display of any colors, logos, designs, images, or graphics on material 180).

While both material 180 and material mounting apparatus 100 are exemplified with rectangular shapes, this disclosure contemplates other shapes (e.g., square, triangular, circular, oval, and various polygonal shapes). Further, material 180 and material mounting apparatus 100 need not be the same shape, since the material 180 may be capable of conforming to the shape of material mounting apparatus 100.

Figure 2:
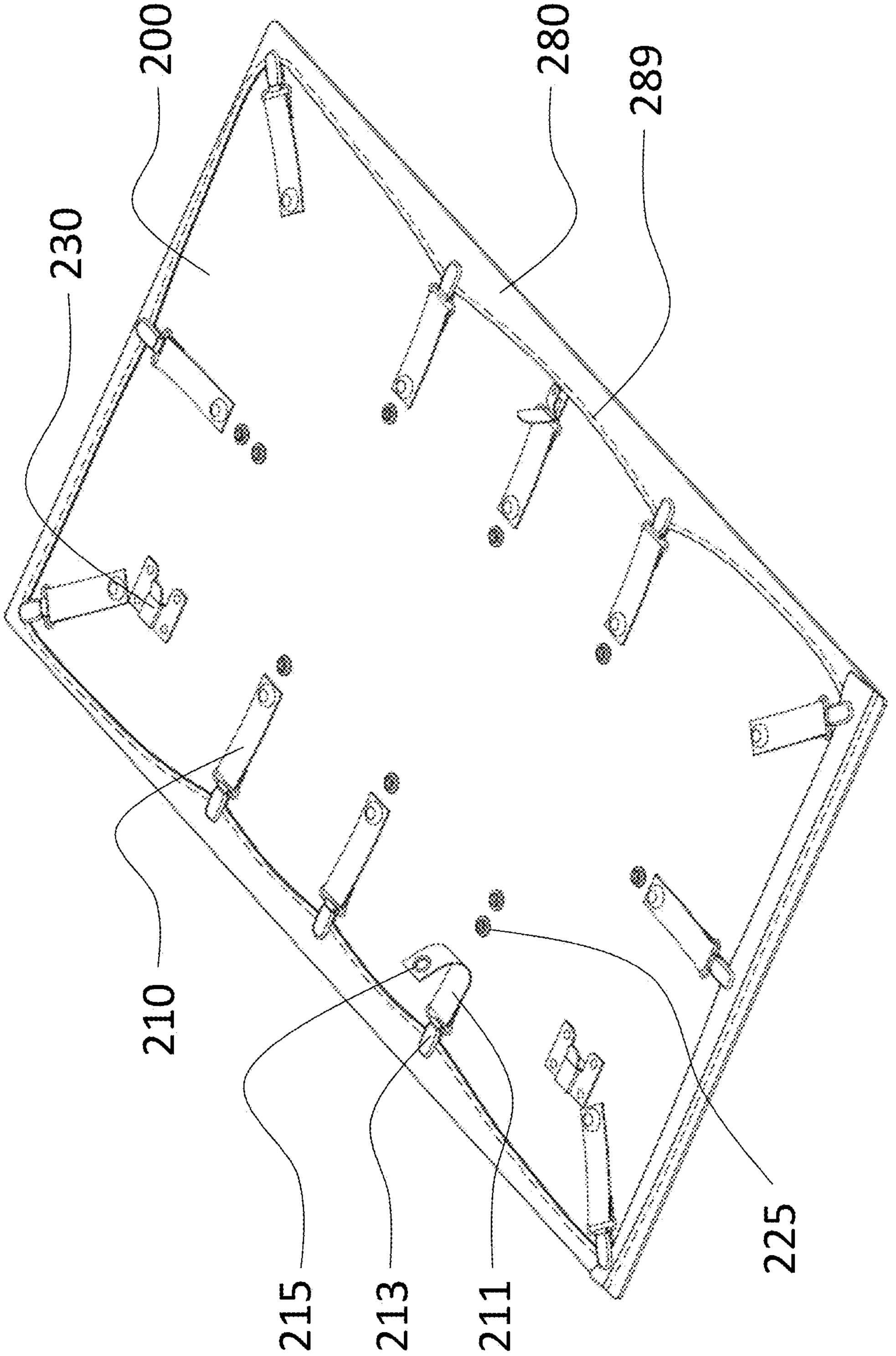
FIG. 2 illustrates an isometric view of a flat material secured to a material mounting apparatus.

FIG. 2 illustrates a material 280 secured to a material mounting apparatus 200. Material 280 may be any one or more of a flag, a banner, a sheet, and a canvass (e.g., for painting). During mounting of material 280 to material mounting apparatus 200, material 280 may be positioned in close proximity to material mounting apparatus 200 such that a material perimeter 289 may be folded over a perimeter of material mounting apparatus 200 (e.g., to contact a back side of material mounting apparatus 200). During mounting of material 280 to material mounting apparatus 200, material perimeter 289 may be brought into contact with one or more connectors 210.

The one or more connectors 210 may be positioned at discrete locations around at least a portion of a perimeter of material mounting apparatus 200. The one or more connectors 210 may be positioned at discrete locations around an entire perimeter of material mounting apparatus 200. Material mounting apparatus 200 may have one or more edges and/or one or more corners which form a shape of a body of material mounting apparatus 200. While FIG. 2 exemplifies the shape of the body of material mounting apparatus 200 as a rectangle, this disclosure contemplates other shapes.

One or more connectors 210 may be positioned along each edge and/or corner. While FIG. 2 exemplifies a single connector 210 along each short edge, three connectors 210 along each long edge, and a single connector 210 at each corner, this disclosure contemplates various combinations of one or more connectors 210 along each edge and/or corner. Each edge and/or corner may have a plurality of connectors 210 (e.g., 1, 2, 3, 4, 5, 6, 7, 8, 9, 10, 11, 12, or more connectors 210). Each edge and/or corner may have a plurality of connectors 210 spaced with any incremental spacing and/or spaced evenly (e.g., every ½, 1, 2, 3, 4, 5, or 6 inches, or more positioned along an edge). The quantity and spacing of the one or more connectors 210 may be determined based on a number of criteria, including, without limitation, symmetry asymmetry, the size of material 280, the weight of material 280, the strength of each connector 210, anticipated environmental conditions (e.g., wind) and so forth.

The one or more connectors 210 may include a tether portion 211, a material attachment portion 213, and a body attachment portion 215. Tether portion 211 may be compliant. Tether portion 211 may be elastic (e.g., having the ability to stretch beyond its natural length). Tether portion 211 may have an elasticity of between 3% and 100%, or more (e.g., stretching to a length that is between 3% and 100% greater in length or more than its natural length). When stretched (and while the connector 210 is coupled to the body and the material 280), tether portion 211 may apply tension to material 280 to retain material 280 in a snug fit over material mounting apparatus 200.

Material attachment portion 213 and body attachment portion 215 may be coupled at opposing ends of tether portion 211. Material attachment portion 213 may be coupled to tether portion 211 at a first end of tether portion 211. Material attachment portion 213 may be capable of being affixed to material 280. Material attachment portion 213 may be coupled to material 280 by clamping, crimping, pinching, hooking, pinning, or by other known means. Material attachment portion 213 may take the form of a clamp, pin, hook and loop, button, rivet, snap, or other known fastening means.

Body attachment portion 215 may be coupled to tether portion 211 at a second end of tether portion 211. Body attachment portion 215 may be capable of being affixed to material mounting apparatus 200 (e.g., to the body of material mounting apparatus 200). Body attachment portion 215 may be coupled to material mounting apparatus 200 by clamping, crimping, pinching, hooking, pinning, or by other known means. Body attachment portion 215 may take the form of a clamp, pin, hook and loop, button, rivet, snap, or other known fastening means.

Body attachment portion 215 may be coupled to a body attachment element 225 of material mounting apparatus 200. Body attachment portion 215 may be coupled to body attachment element 225 by clamping, crimping, pinching, hooking, pinning, or by other known means. Body attachment element 225 may take the form of a clamp, pin, hook and loop, button, rivet, snap, or other known fastening means.

Material mounting apparatus 200 may have one or more body attachment elements 225 to facilitate attachment of the one or more connectors 210. Material mounting apparatus 200 may have one or more body attachment elements 225 to facilitate attachment of each of the one or more connectors 210 (e.g., in a number greater than or equal to the number of connectors 210 and having the desired spacing as described in this disclosure with regard to the connectors). Each of the one or more connectors 210 may be coupled to one or more body attachment elements located optimally on the body of material mounting apparatus 200 (e.g., the body attachment elements having even spacing).

Each of the one or more body attachment elements 225 may be clustered in proximity to one or more additional body attachment elements 225 (e.g., a cluster of 1, 2, 3, 4, 5, 6, 7, 8, or more body attachment elements 225). The one or more body attachment elements 225 in a cluster may be organized into a row and/or column, where the row and/or column of one or more body attachment elements 225 falls along and/or is arranged along a line extending perpendicular to a portion of the perimeter of material mounting apparatus 200 (e.g., perpendicular to an edge of material mounting apparatus 200). The one or more body attachment elements 225 in a cluster may be organized into a row and/or column, where the row and/or column of one or more body attachment elements 225 falls along and/or is arranged along a line extending at an angle to a portion of the perimeter of material mounting apparatus 200 (e.g., at a 45 degree angle to opposing edges at a corner of material mounting apparatus 200, where the edges are offset by 90 degrees to each other). As other shapes are contemplated by this disclosure, this disclosure also contemplates rows and/or columns of body attachment elements 225 extending along lines having other angular offsets to corresponding edges and/or corners (e.g., along a line of symmetry of opposing edges having a common corner).

During attachment of material 280 to material mounting apparatus 200, one or more connectors 210 may be affixed along discrete positions of the perimeter 289 of material 280. The discrete positions of the one or more connectors 210 may correspond to the location of the one or more body attachment elements 225 on the body of material mounting apparatus 200. Material attachment portion 213 may be affixed to material 280. Body attachment portion 215 may be affixed to a body attachment element 225. If tether portion 211 is loose, body attachment portion 215 may be decoupled from the body attachment element 225 and coupled to the next further body attachment element 225 (e.g., next further indicates a greater distance from the perimeter of the material mounting apparatus 200 along the row and/or column of one or more body attachment elements 225). This process may be repeated until tether portion 211 is no longer loose (e.g., tether portion 211 may be at its fully extended length without stretch, or may be stretched beyond its fully extended length).

In practice, a plurality of connectors 210 may be coupled to material 280 and to material mounting apparatus 200. The plurality of connectors 210 may be positioned around a perimeter of material mounting apparatus 200 and/or material 280, until material 280 is firmly affixed to material mounting apparatus 200 with its perimeter 289 extending beyond a perimeter of material mounting apparatus 200, with its perimeter 289 folded back over the perimeter of material mounting apparatus 200, and with its perimeter 289 secured along the back side of material mounting apparatus 200 as presented in this disclosure. Thus, the one or more connectors 210 may be adjustable to accommodate differently sized materials 280.

Material mounting apparatus 200 may include one or more hanging elements 230. Hanging elements 230 may enable material mounting apparatus 200 to be hung (e.g., on a wall, from a tether, or by other known means).

Figure 3:
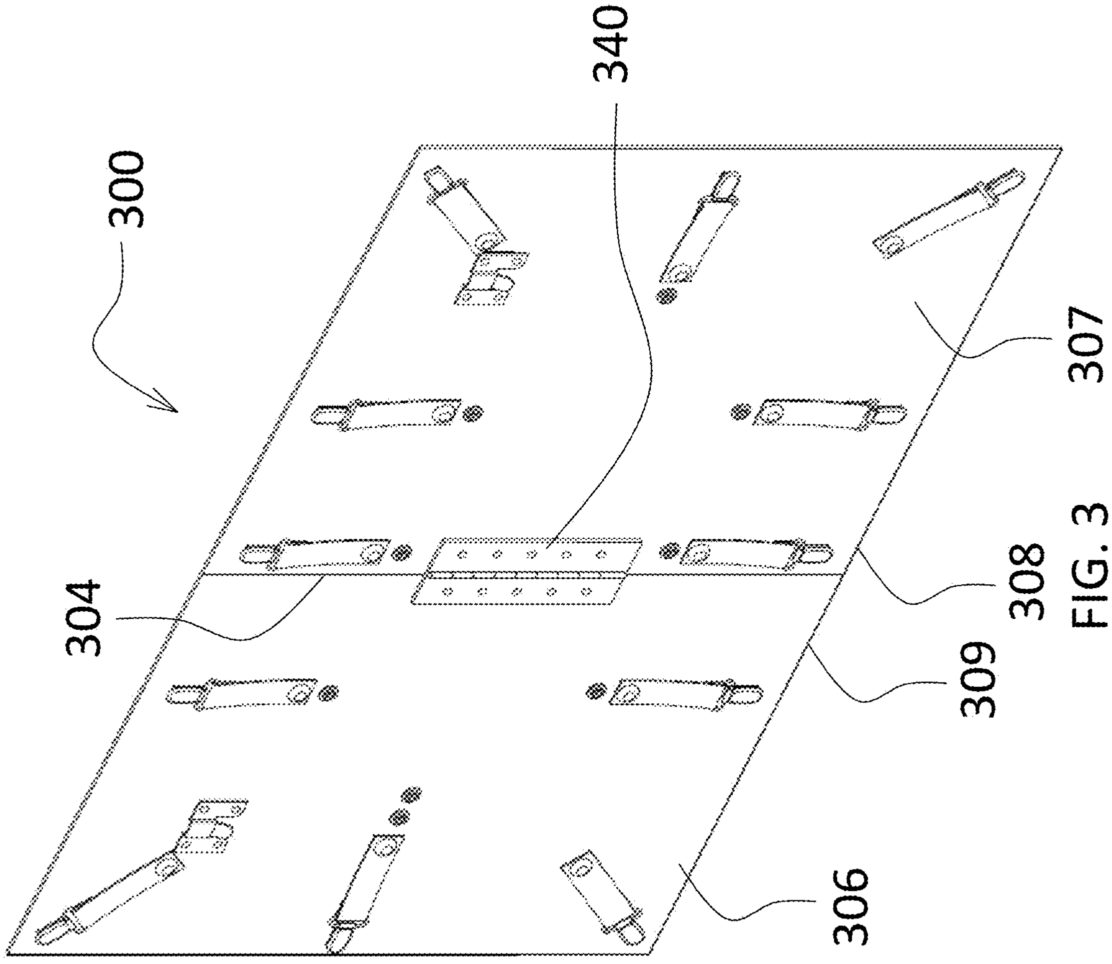
FIG. 3 illustrates an isometric view of a material mounting apparatus having a two-piece construction.

FIG. 3 illustrates a material mounting apparatus 300 having a two-piece construction. Material mounting apparatus 300 may have a body defined by a first piece 306 and a second piece 307. First piece 306 may have a first perimeter 309. Second piece 307 may have a second perimeter 308. A portion of perimeter 309 may be oriented adjacently to a portion of perimeter 308 (e.g., along line 304). First piece 306 may be approximately similar in size, shape, and/or dimensions to second piece 307 (e.g., as exemplified in FIG. 3), or may be substantially different in size, shape, and/or dimensions.

First piece 306 may be coupled to second piece 307. First piece 306 may be secured to second piece 307 by a hinge element 340. Hinge element 340 may extend the full length of adjoining sides of first piece 306 and second piece 307, or less. Hinge element 340 may extend along the entire length of adjacently situated portions of perimeters 308, 309 (e.g., along line 304), or less. Hinge element 340 may enable the material mounting apparatus 300 to be folded so as to have a smaller cross-section (e.g., for transport, shipment, and so forth). Hinge element 340 may enable the material mounting apparatus 300 to be unfolded so as to have a larger cross-section (e.g., for display of a material).

While FIG. 3 exemplifies a two-piece construction of a material mounting apparatus having a hinge element 340, other types of flexible barriers/seams may be employed to accomplish the folding feature described in this disclosure (e.g., such as the use of any number of compliant/flexible materials joined between the respective elements of the two-piece construction to enable folding). Further, while FIG. 3 exemplifies a two-piece construction with one adjoining flexible seam, this disclosure contemplates material mounting apparatuses having more than two pieces and/or more than one adjoining flexible seam (e.g., three pieces with 2 flexible seams, four pieces, with three flexible seams, or more).

Other aspects will be apparent to those skilled in the art from consideration of the specification and practice disclosed herein. It is intended, therefore, that the specification and illustrated figures be considered as examples only.

What is claimed is:

1. A material mounting apparatus capable of receiving a material having a perimeter, comprising:

a body formed of a first piece and a second piece secured by a hinge element, the body having a front side and a back side;

a plurality of body attachment elements secured to the body along the back side; and a plurality of connectors coupled to the plurality of body attachment elements, wherein the material extends across the front side of the body, wherein the perimeter of the material folds around to the back side of the body, and wherein the plurality of connectors are coupled to the material.

2. The material mounting apparatus of claim 1, wherein the plurality of connectors includes a tether portion, wherein the tether portion is elastic, and wherein the tether portion applies tension to the material to retain the material in a snug fit over the body.

3. The material mounting apparatus of claim 1, wherein the plurality of connectors includes a material attachment portion capable of securement to the material.

4. The material mounting apparatus of claim 1, wherein the plurality of connectors includes a body attachment portion capable of securement to any one of the plurality of body attachment elements.

5. The material mounting apparatus of claim 1, wherein the plurality of connectors are coupled along the perimeter of the material.

6. The material mounting apparatus of claim 1, wherein the plurality of connectors are spaced evenly along the perimeter of the body.

7. The material mounting apparatus of claim 1, wherein the plurality of body attachment elements are arranged in one or more of rows and columns on the body, and wherein the rows and columns are spaced around the perimeter of the body.

8. A material mounting apparatus capable of receiving a material, comprising:

a body formed of a first piece and a second piece secured by a hinge element;

a plurality of body attachment elements secured to a first side of the body; and a plurality of connectors coupled to the plurality of body attachment elements, wherein the material extends across a second side of the body, wherein a perimeter of the material extends from the second side to the first side of the body, and wherein the plurality of connectors are coupled to the material.

9. The material mounting apparatus of claim 8, wherein the plurality of connectors includes one or more of:

a tether portion, the tether portion retaining the material in a snug fit over the body;

a material attachment portion coupled at a first side of the tether portion, the material attachment portion coupled to the material; and a body attachment portion coupled at a second side of the tether portion, the body attachment portion coupled to any one of the plurality of body attachment elements.

10. The material mounting apparatus of claim 8, wherein the plurality of body attachment elements are arranged in one or more of rows and columns on the body, and wherein the rows and columns are spaced around a perimeter of the body.

11. The material mounting apparatus of claim 10, wherein the rows and columns of body attachment elements extend along one or more lines extending perpendicular to a portion of the perimeter of the body.

12. The material mounting apparatus of claim 10, wherein the rows and columns of body attachment elements extend along one or more lines extending at an angle to a portion of the perimeter of the body.

13. The material mounting apparatus of claim 10, wherein the plurality of connectors are coupled to at least one of the plurality of body attachment elements in each row or column.

14. A method of mounting a material to a body of a material mounting apparatus, comprising:

forming the body of a first piece and a second piece secured by a hinge element;

securing a plurality of body attachment elements to a first side of the body of the material mounting apparatus;

extending the material across a second side of the body;

folding a perimeter portion of the material across a perimeter portion of the material mounting apparatus until the perimeter portion of the material extends to the first side of the body;

securing a plurality of connectors to the plurality of body attachment elements; and securing the plurality of connectors to the material.

15. The method of claim 14, wherein the plurality of connectors include a tether portion, wherein the tether portion is elastic, and wherein the tether portion applies tension to the material to retain the material in a snug fit over the body.

16. The method of claim 14, wherein the plurality of connectors include a material attachment portion, and wherein securing the plurality of connectors to the material includes securing the material attachment portion to the material.

17. The method of claim 14, wherein the plurality of connectors include a body attachment portion, and wherein securing the plurality of connectors to the plurality of body attachment elements includes securing the body attachment portion to one of the plurality of body attachment elements.

18. The method of claim 14, wherein securing the plurality of body attachment elements to the first side of the body of the material mounting apparatus includes securing the plurality of body attachment elements in one or more of rows and columns, wherein the rows and columns are spaced around a perimeter of the body, and wherein securing the plurality of connectors to the plurality of body attachment elements includes securing the plurality of connectors to at least one of the plurality of body attachment elements in each row or column.

19. The method of claim 18, wherein the rows and columns of body attachment elements extend along one or more lines extending perpendicular to a portion of the perimeter of the body.

20. The method of claim 18, wherein the rows and columns of body attachment elements extend along one or more lines extending at an angle to a portion of the perimeter of the body.

* * * * *